United States Patent
Chen

(10) Patent No.: US 10,528,308 B2
(45) Date of Patent: Jan. 7, 2020

(54) AIDED DESIGN METHOD OF PRINT LAYERS FOR 3D PRINTING

(71) Applicants: XYZPRINTING, INC., New Taipei (TW); KINPO ELECTRONICS, INC., New Taipei (TW)

(72) Inventor: Peng-Yang Chen, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 0 days.

(21) Appl. No.: 16/024,710

(22) Filed: Jun. 29, 2018

(65) Prior Publication Data

US 2019/0243589 A1    Aug. 8, 2019

(30) Foreign Application Priority Data

Feb. 7, 2018 (CN) .......................... 2018 1 0124053

(51) Int. Cl.
*G06F 3/12* (2006.01)
*B33Y 50/02* (2015.01)
(Continued)

(52) U.S. Cl.
CPC ............ *G06F 3/1256* (2013.01); *B33Y 50/02* (2014.12); *G05B 19/4099* (2013.01);
(Continued)

(58) Field of Classification Search
None
See application file for complete search history.

(56) References Cited

U.S. PATENT DOCUMENTS

2015/0134096 A1    5/2015 Travers et al.
2016/0067928 A1*   3/2016 Mark .................... B29C 64/209
                                            264/401
(Continued)

FOREIGN PATENT DOCUMENTS

EP    3182308 A1    6/2017

OTHER PUBLICATIONS

Langelaar Matthijs Ed—Evgrafov Anton et al: "An additive manufactunng filter for topology optimization of print-ready designs", Structural and Multidisciplinary Optimization, Springer Berlin Heidelberg, Berlin/Heidelberg, vol. 55, No. 3, Jul. 22, 2016, pp. 871-883, XP036175923, ISSN: 1615-147X, DOI: 10.1007/S00158-016-1522-2 *abstract*.

(Continued)

*Primary Examiner* — Frantz Bataille
(74) *Attorney, Agent, or Firm* — Chun-Ming Shih; HDLS IPR Services

(57) ABSTRACT

An aided design method of print layers for 3D printing is provided. The method is performed for rendering and displaying a GUI at a computer apparatus, selecting one of print layers, configuring an editable region and marking it on the GUI, configuring one or more print block(s) in the editable region according to an edit operation, generating one of multiple layers of object print data according to the print block(s) and performing above-mentioned steps repeatedly until all of the multiple layers of the object print data have been generated. The present disclosed example has an ability to aid the user to design multiple print layers and reducing a probability of failure of printing 3D physical model.

12 Claims, 12 Drawing Sheets

(51) Int. Cl.
*G05B 19/4099* (2006.01)
*G06F 17/50* (2006.01)

(52) U.S. Cl.
CPC ............ *G06F 3/1208* (2013.01); *G06F 17/50* (2013.01); *G05B 2219/35134* (2013.01); *G05B 2219/49007* (2013.01); *G06F 2217/12* (2013.01)

(56) References Cited

U.S. PATENT DOCUMENTS

| | | | |
|---|---|---|---|
| 2016/0080602 A1* | 3/2016 | Ishida | ................ H04N 1/32203 358/3.28 |
| 2017/0225397 A1 | 8/2017 | Ho et al. | |
| 2017/0239719 A1* | 8/2017 | Buller | .................... B29C 64/40 |

OTHER PUBLICATIONS

Alexandru Telea et al: "Voxel-Based Assessment of Printability of 3D Shapes" In: "Lecture Notes in Computer Science", Jan. 1, 2011, Springer Berlin Heidelberg, Berlin, Heidelberg, XP055209926, ISSN: 0302-9743, ISBN: 978-3-54-045234-8, vol. 6671, pp. 393-404, DOI: 10.1007/978-3-642-21569-8_34, *abstract* *pp. 398-399*.

Ven Emiel Van De et al: "Continuous front propagation-based overhang control for topology optimization with additive manufacturing", Structural and Multidisciplinary Optimization, Springer Berlin Heidelberg, Berlin/Heidelberg, vol. 57, No. 5, Jan. 20, 2018, pp. 2075-2091, XP036492583, ISSN: 1615-147X, DOI: 10.1007/S00158-017-1880-4 *abstract*.

Marco Livesu et al: "From 3D models to 3D prints: an overview of the processing pipeline", Computer Graphics Forum, vol. 36, No. 2, May 23, 2017, pp. 537-564, XP055393619, GB ISSN: 0167-7055, DOI: 10.1111/cgf.13147 *abstract* *Figs. 2, 3, 7*.

Search Report dated Dec. 17, 2018 of the corresponding European patent applicaiton.

* cited by examiner

AIDED DESIGN METHOD OF PRINT LAYERS FOR 3D PRINTING

BACKGROUND OF THE INVENTION

Field of the Invention

The technical field relates to 3D printing and more particularly related to an aided design method of print layers for 3D printing.

Description of Related Art

For manufacturing a customized 3D physical model in the 3D printing technology of the related art, the user must design 3D object data by operating a 3D drawing software, control a computer to execute a slicing software to execute a slicing process on the drawn 3D object data for generating the multiple print data, and control the 3D printer to print the generated multiple print data for manufacturing the 3D physical model.

However, an operating threshold of above-mentioned 3D drawing software is too high to operate easily if the user is untrained. This makes most users do not have an ability of designing the customized 3D object data, and do not have an ability of manufacturing the customized 3D physical model.

Moreover, the user is not necessary to consider an effect of the gravity on 3D object data during designing the 3D object data by the 3D drawing software. This may make some 3D object data inappropriate to print be designed by the user, such as the 3D object data having an over-tilted side surface or the unsteady 3D object data, such that the situations of failure in printing may occur during printing those 3D object data caused by collapse or overturn.

Accordingly, there is currently a need for a schema of aiding the user to design 3D object data appropriate to print.

SUMMARY OF THE INVENTION

The present disclosed example is directed to an aided design method of print layers for 3D printing having an ability of aiding the user to design each of the print layers appropriate to print and generating the corresponding print data automatically.

One of the exemplary embodiments, an aided design method of print layers for 3D printing, comprises following steps: controlling a computer apparatus to render a GUI and displaying the GUI; selecting one of multiple print layers; configuring an editable region of the current print layer and marking the editable region; selecting at least one editable block of the editable region as at least one print block according to an edit operation; generating one layer of object print data according to the at least one print block; and, performing above-mentioned steps repeatedly until all of the multiple layers of the object print data have been generated.

The present disclosed example has an ability to aid the user to design multiple print layers and reducing a probability of failure of printing 3D physical model.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims are all covered by the claims claimed by the present disclosed example.

Figure 1:
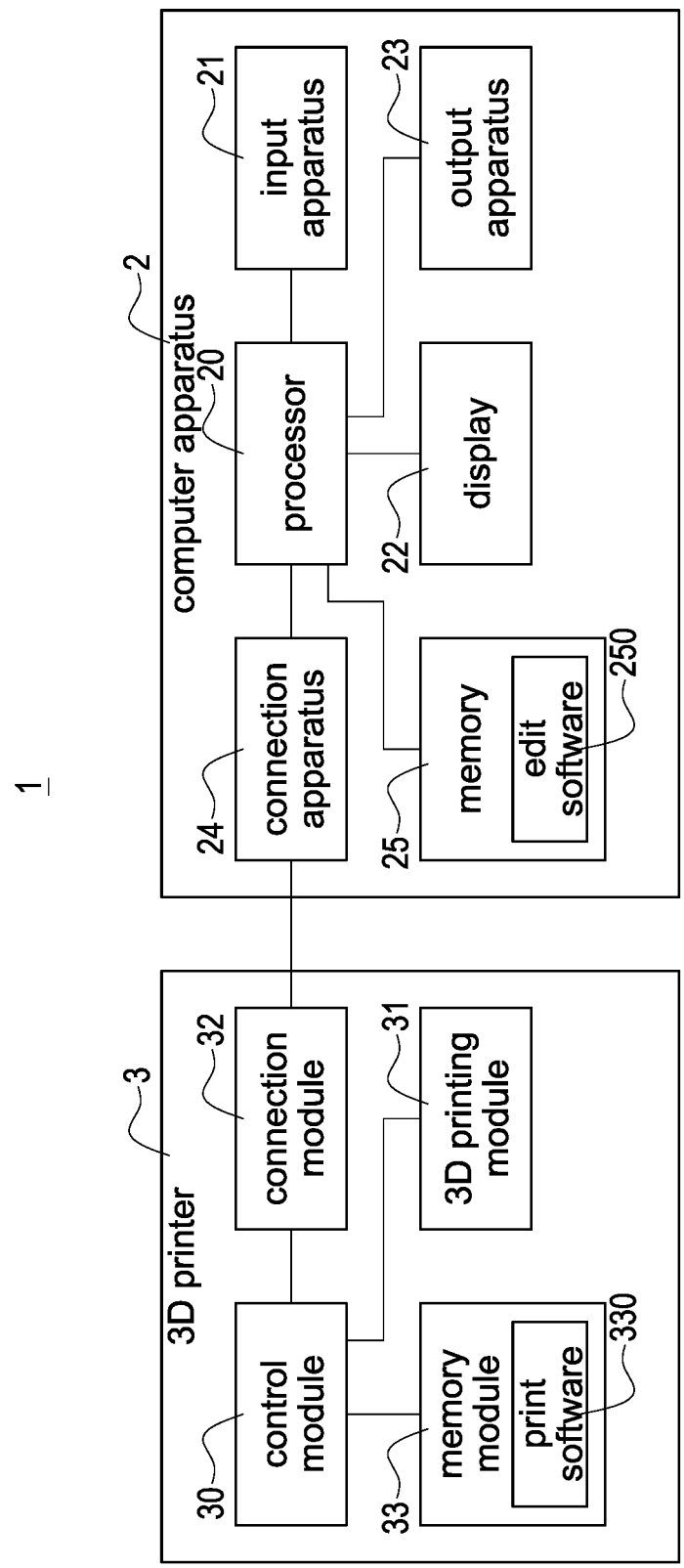
FIG. 1 is an architecture diagram of a 3D printing system according to a first embodiment of the present disclosed example.

Please refer to FIG. 1, which is an architecture diagram of a 3D printing system according to a first embodiment of the present disclosed example. As shown in the figure, the present disclosed example discloses a 3D printing system 1. The 3D printing system 1 has an ability of aiding a user to design the multiple print layers corresponding to a 3D physical model. Above-mentioned multiple print layers may be used to manufacture the 3D physical model. The 3D printing system 1 may comprise an edit software 250 used to be installed in a computer apparatus 2 (such as a desktop, a laptop, a cloud server or a smartphone) and a 3D printer 3.

One of the exemplary embodiments, the computer apparatus 2 may comprise input apparatus 21 (such as a Keypad, a mouse, a keyboard, a touchpad or the other input apparatuses), display 22, output apparatus 23 (such as a speaker, an indicator light, a buzzer or the other output apparatuses), a connection apparatus 24 (such as a USB module, a Wi-Fi module or the other wired/wireless connection modules), a memory 25 and a processor 20 electrically connected to above apparatuses.

The edit software 250 is stored in a memory 25 of the computer apparatus 2. The memory 25 is a non-transient computer-readable recording media, a plurality of computer-readable codes is recorded in the edit software 250. After the processor 20 executes the edit software 250, the processor 20 may control each of the apparatuses of the computer apparatus 2 to perform the aided design steps described later.

One of the exemplary embodiments, the input apparatus 21 and the display 22 may be integrated into a single touchscreen.

The 3D printer 3 (such as a stereolithography 3D printer or a fused deposition modeling 3D printer) may comprise a 3D printing module 31, a connection module 32, a memory module 33 and a control module 30 electrically connected to above modules.

The 3D printing module 31 is used to execute the 3D printing via being controlled by the control module 30 for manufacturing a 3D physical model. The connection module 32 (such as a USB module, a Wi-Fi module or the other wired/wireless connection module) is used to connect to the external apparatus (such as the connection apparatus 24 of the computer apparatus 2) for receipt of the data (such as the print data described later). The memory module 33 is used to store data, such as store the print software 330 (the print software 330 may be a firmware or operating system of the 3D printer 3, but this specific example is not intended to limit the scope of the present disclosed example). The control module 30 is used to control the 3D printer 3.

One of the exemplary embodiments, the memory module 33 is a non-transient computer-readable recording media, a plurality of computer-readable codes is recorded in the print software 330. After the control module 30 executes the print software 330, the control module 30 may control the 3D printing module 31 to receive the print data via the connection module 32 or load the print data from the memory module 33, and perform the print steps described later according to the print data.

Figure 2:
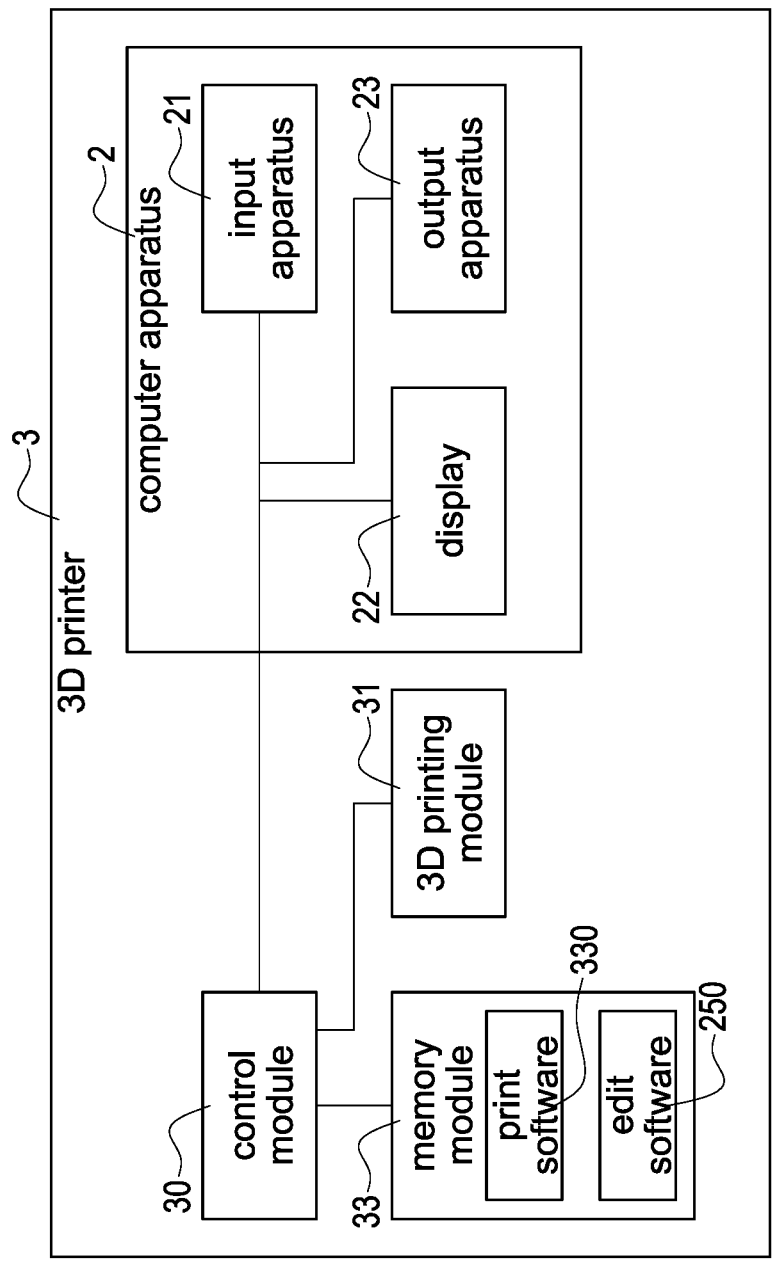
FIG. 2 is an architecture diagram of a 3D printing system according to a second embodiment of the present disclosed example.

Please refer to FIG. 2 simultaneously, which is an architecture diagram of a 3D printing system according to a second embodiment of the present disclosed example. In this embodiment, the computer apparatus 2 and the 3D printer 3 are integrated into a single apparatus.

Take the computer apparatus 2 is integrated into the 3D printer 3 for example, as shown in the figure, in the integrated 3D printer 3, the input apparatus 31, the output apparatus 23 and the display 22 of the computer apparatus 2 is connected to the control module 30 of the 3D printer 3 via the internal cables, so as to make the connection module 32 and the connection apparatus 24 are unnecessary and may be removable. Moreover, the integrated 3D printer 3 is controlled by the control module 30, and stores data by the memory module 33, so as to make the processor 22 and the memory 25 are unnecessary and may be removable (namely, the edit software 250 may be stored in the memory module 33).

The present disclosed example can effectively reduce the volume of the 3D printing system via integration of the computer apparatus 2 and the 3D printer 3 as a single apparatus.

Figure 3:
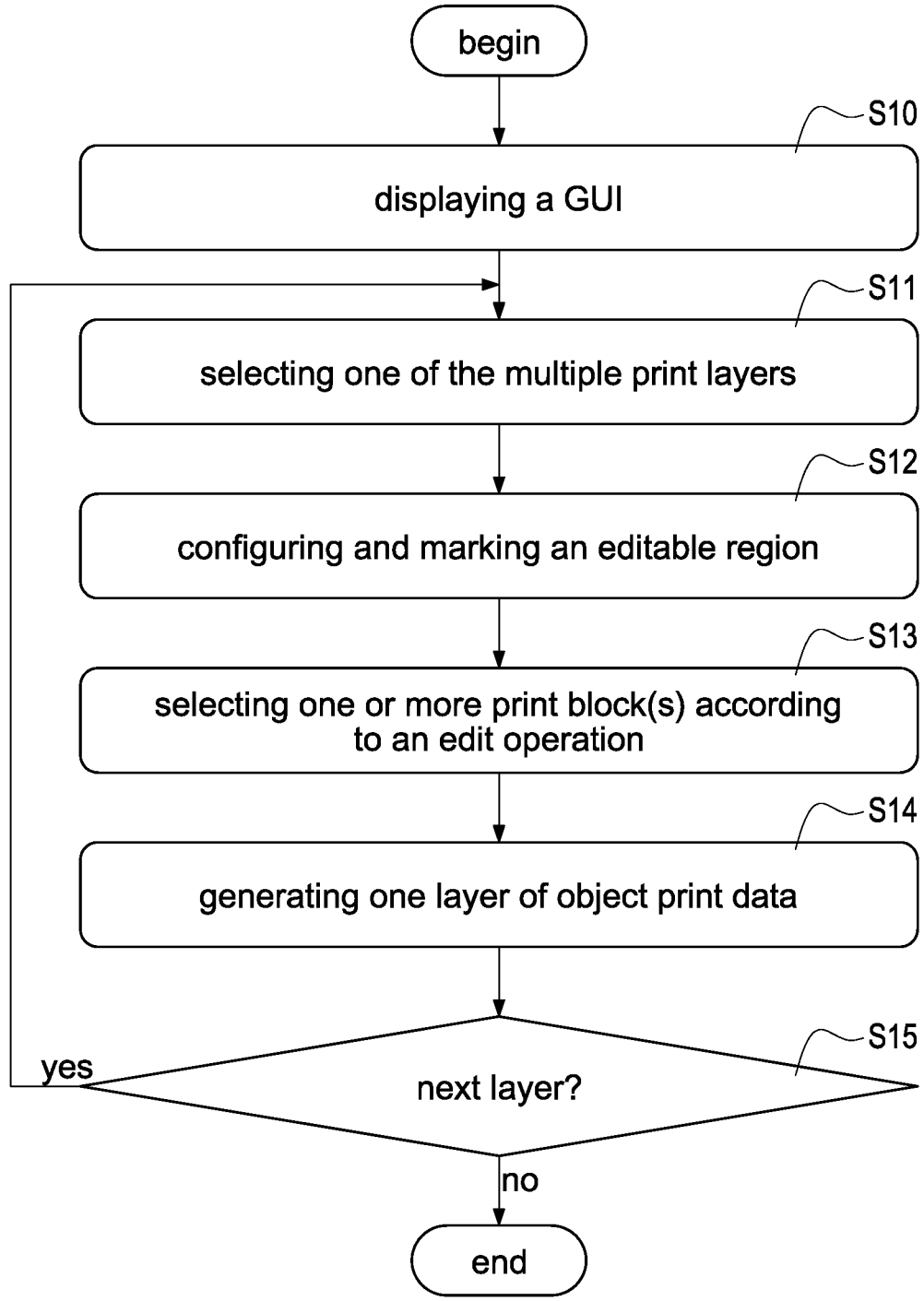
FIG. 3 is a flowchart of an aided design method of print layers according to a first embodiment of the present disclosed example.

Please refer to FIG. 3 simultaneously, which is a flowchart of an aided design method of print layers according to a first embodiment of the present disclosed example.

The aided design method of print layers for 3D printing of each of the embodiments of the present disclosed example may be implemented by any of the 3D printing systems shown in FIG. 1 and FIG. 2. After the processor 20 (as shown in FIG. 1) or the control module 30 (as shown in FIG. 2) executes the edit software 250, each step of the aided design method of print layers for 3D printing may be performed (take the 3D printing system 1 shown in FIG. 1 for example in following described later).

The aided design method of the present disclosed example is used to provide a GUI (Graphical User Interface) for making the user have an ability of editing the multiple print layers of the 3D physical model manually to design a printing range of each of the multiple print layers (namely, determining a shape of each layer of the 3D physical model) and determining the corresponding object print data according to each of the determined printing range.

Moreover, the aided design method of the present disclosed example may remind the user of an editable region of each print layers during editing each print layers. The success probability of executing a 3D printing according to the generated object print data increases if the printing range determined by the user is within the editable region. The aided design method of this embodiment comprises following steps.

Step: S10: the processor 20 renders a Graphical User Interface (GUI), and displays the rendered GUI on the display 22.

One of the exemplary embodiments, above-mentioned GUI may comprise a plurality of blocks (a number of the blocks and/or a size of each block may be adjusted according to a printing resolution of the 3D printer 3 and/or a material characteristic of the print materials used by the 3D printer 3), and the blocks may be displayed on the display 22 (as shown in FIG. 11A to FIG. 11D) if the GUI is displayed.

Step S11: the processor 20 selects one of the multiple print layers in order, such as the first print layer.

Step S12: the processor 20 plans and configures an editable region shown in the GUI of the selected print layer, and marks the configured editable region.

One of the exemplary embodiments, the processor 20 plans and configures the editable region of the current print layer according to a printable range of the 3D printing module 31, an adhesion of the used print materials, the layer number of the current print layer and/or a range of the configured print blocks of the other print layer (such as the previous layer or the bottom layer), and marks the editable region (such as marking with a specific color or a specific pattern).

One of the exemplary embodiments, each of the print layers comprises a plurality of blank blocks. The processor 20 adds one or more blank block(s) to the editable region as one or more editable block(s) for completion of configuring above-mentioned editable region.

Step S13: the processor 20 receives an edit operation from the user by the input apparatus 21, selects one or more editable block(s) in the configured editable region according to the edit operation, and configures the selected editable block(s) as the print block(s).

One of the exemplary embodiments, above-mentioned edit operation is that the user selects one or more editable block(s) in the editable region by the input apparatus 21.

One of the exemplary embodiments, the processor 20 may issue a notification by the display 22 or the output apparatus 23 for reminding the user that the print range comprising the currently selected blank block causes a higher probability of failure in printing if the processor 20 detects that any blank block outside of the editable region is selected by the user. Moreover, the processor 20 may suggest the user selecting the other editable block inside of the editable region.

One of the exemplary embodiments, the processor 20 may prohibit the user from selecting any blank block outside of the editable region directly.

Step S14: the processor 20 generates one layer of the object print data (such as generating the first layer of the object print data) according to the selected one or more print block(s).

One of the exemplary embodiments, the processor 20 determines a printing range if the current print layer according to the selected print block(s), and generates one layer of the object print data according to the printing range.

One of the exemplary embodiments, the 3D printer 3 is a Fused Deposition Modeling (FDM) 3D printer, the 3D printing module 31 may comprise a modeling nozzle, and each layer of the object print data is used to describe one printing path for printing the corresponding layer of a slice physical model. The print of each of the print layers is completed after the modeling nozzle prints along the printing path of each layer of the object print data.

One of the exemplary embodiments, the 3D printing is a stereolithography 3D printer, the 3D printing module 31 may comprise a light module, and each layer of the object print data is used to describe one 2D image. The print of each of the print layers is completed after the light module irradiates the stereolithography materials according to each 2D image corresponding to each layer of the object print data.

Step S15: the processor 20 determines whether completion of the design of all the print layers.

One of the exemplary embodiments, the processor 20 may render a "completion of design" button and a "next layer" button and displays the buttons in the GUI.

The processor 20 determines completion of the design of all the print layers if the user pressed the "completion of design" button. The processor 20 determines incompletion of the design of all the print layers if the user pressed the "next layer" button.

One of the exemplary embodiments, the processor 20 determines whether a layer number of the designed print layers is consistent with a default layer number (such as 100 layers). The processor 20 determines completion of the design of all the print layers if the layer number of the designed print layers is consistent with the default layer number, and determines incompletion of the design of all the print layers if the layer number of the designed print layers is not consistent with the default layer number.

The aided design method is terminated if the processor 20 determines completion of the design of all the print layers.

The step S11 to the step S14 are performed again for selecting the other print layer and designing this print layer if the processor 20 determines incompletion of any print layer. For example, the processor 20 selects the second print layer, plans, configures and marks an editable region of the second print layer, receives the other edit operation and selects the partial print block(s) inside of the editable region of the second print layer according to the other edit operation, and generates the second layer of the object print data according to the selected print block(s).

Thus, the present disclosed example has an ability to aid the user to design the multiple print layers corresponding to a 3D physical model. Moreover, the present disclosed example has an ability of reducing a probability of failure of printing 3D physical model if the 3D printer executes 3D printing according to the multiple layers of the object print data generated by the present disclosed example.

Figure 4:
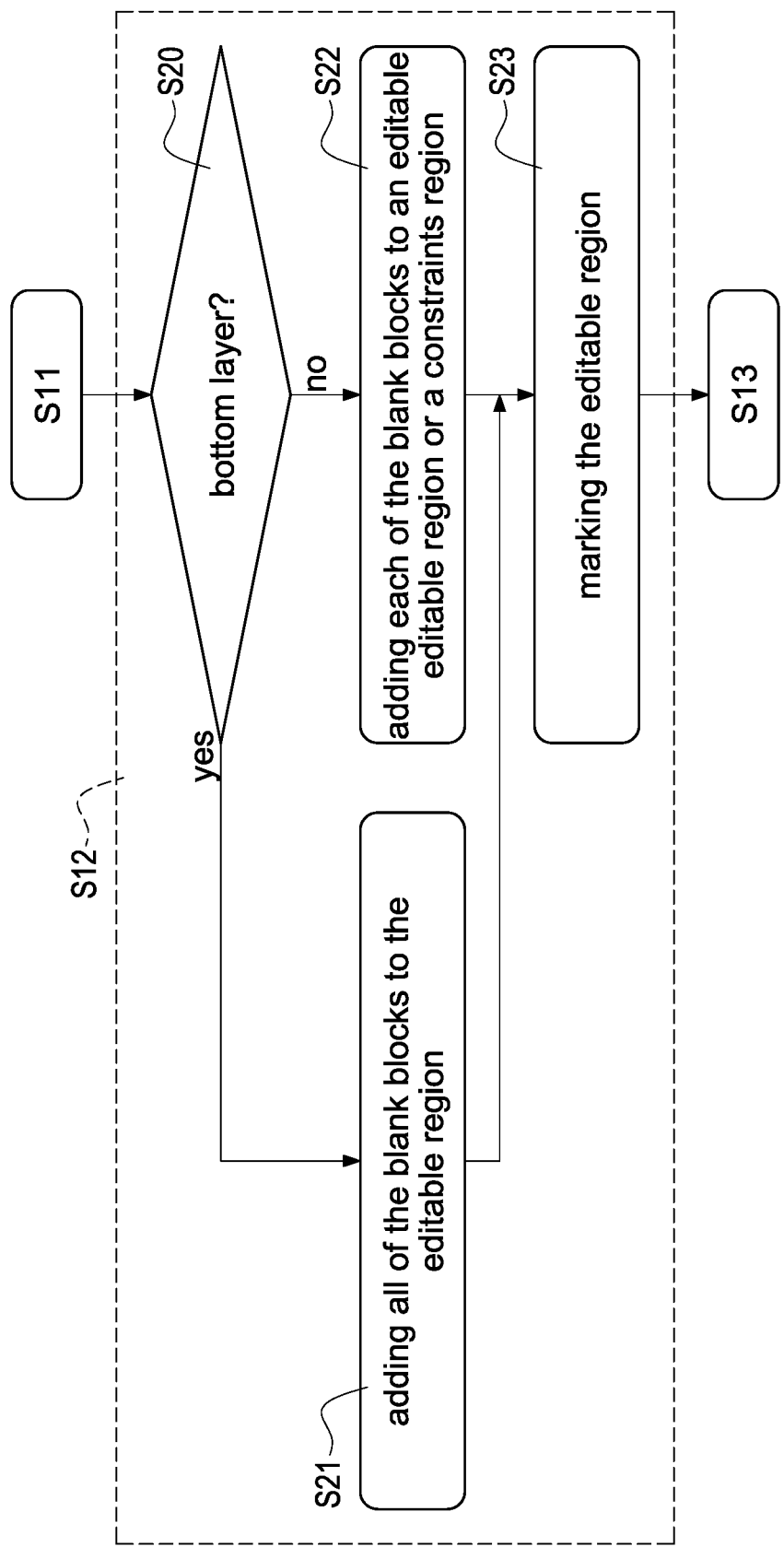
FIG. 4 is a partial flowchart of an aided design method of print layers according to a second embodiment of the present disclosed example.

Please refer to FIG. 3 and FIG. 4 simultaneously, FIG. 4 is a partial flowchart of an aided design method of print layers according to a second embodiment of the present disclosed example. In comparison with the aided design method shown in FIG. 3, the step S12 of the aided design method of this embodiment comprises following steps.

Step S20L the processor 20 determines whether the currently selected print layer is a bottom layer (namely, the first layer).

The processor 20 performs the step S21 if determining that the currently selected print layer is the bottom layer. Otherwise, the processor 20 performs the step S22.

Step S21: the processor 20 adds all the blank blocks of the current print layer to the editable region.

More specifically, because all of the positions respectively corresponding to all of the blank blocks contact a modeling platform (not shown in the figure) of the 3D printer 3 directly, the present disclosed example can prevent the printed slice physical model corresponding to the current print layer from collapsing caused by sufficient support force during 3D printing if the current print layer is the bottom layer. Thus, the processor 20 may add all the blank blocks of the current print layer to the editable region as the editable blocks directly if the current print layer is the bottom layer.

Step S22: the processor 20 may add one or more blank block(s) of the current print layer to the editable region as the editable block(s) according to the positions of the print block(s) of the other print layer (such as the previous layer or the bottom layer) if the currently selected print layer is not the bottom layer (for example, the second layers or higher).

One of the exemplary embodiments, the other print layer is below the current print layer. Namely, the other print layer is used to support the current print layer.

More specifically, one of the positions of the blocks of the current print layer may not obtain the sufficient support force and collapse caused by suspension during 3D printing if the current print layer is not the bottom layer. Thus, the processor 20 may select the blank blocks which can obtain the sufficient support force during 3D printing and configures the selected blank blocks as the editable blocks (namely, adding the blank blocks to the editable region) according to the positions and/or distribution of the print blocks of the other print layer below the current print layer.

Step S23: the processor 20 marks the editable region. For example, the processor 20 marks all of the editable blocks.

Figure 5:
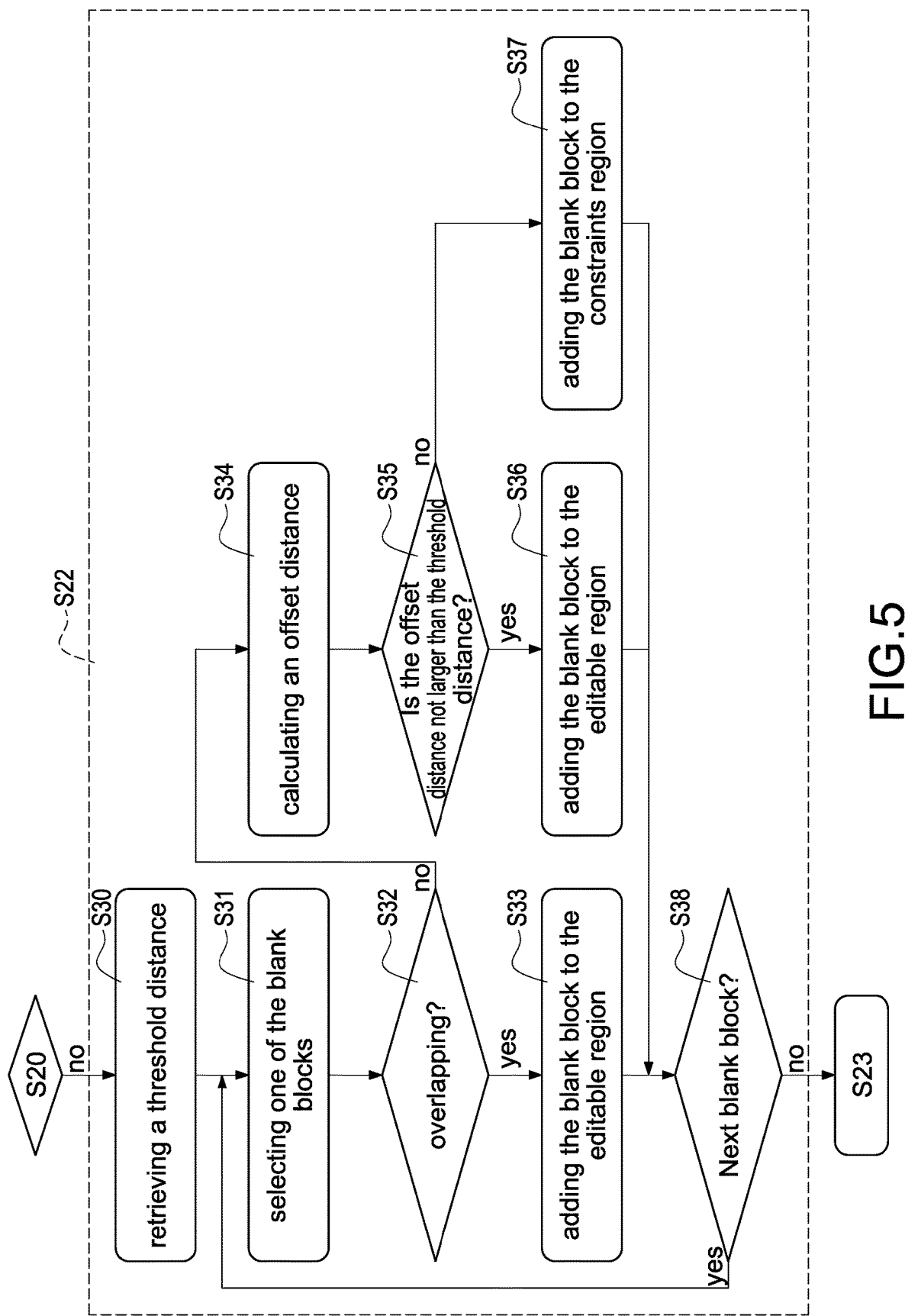
FIG. 5 is a partial flowchart of an aided design method of print layers according to a third embodiment of the present disclosed example.

Please refer to FIG. 3 FIG. 5, FIG. 5 is a partial flowchart of an aided design method of print layers according to a third embodiment of the present disclosed example. In comparison with the aided design method shown in FIG. 3 and FIG. 4, the step S22 of the aided design method of this embodiment comprises following steps.

Step S30: the processor 20 retrieves a threshold distance (such as 3).

One of the exemplary embodiments, the above-mentioned threshold distance is determined according to the characteristic (such as adhesion) of the print materials and/or the layer number of the current print layer.

Step S31: the processor 20 selects one of the blank blocks of the current print layer.

Step S32: the processor 20 determines whether all or parts of the positions of the blank blocks of the current print layer overlap all or parts of the positions of the print blocks of the other print layer (such as the bottom layer or the previous layer). Namely, the processor 20 determines whether the selected blank blocks are supported by any print block of the other print layer directly or indirectly or suspended (namely, the selected blank blocks do not obtain the sufficient support force directly or indirectly).

The processor 20 performs the step S33 if the processor 20 determines that the selected blank blocks overlap any print block of the other print layer. Otherwise, the processor 20 performs the step S34.

Step S33: the processor 20 adds the selected blank blocks to the editable region for configuring the selected blank blocks as the editable blocks. Namely, the blocks are selectable by the user.

The step S34 is performed by the processor 20 if the processor 20 determines that the all of the positions of the selected blank blocks do not overlap any of the positions of the print blocks of the other print layer in the performance of the step S32. Step S34: the processor 20 calculates an offset distance between the selected blank blocks and one or more print block(s) of the other print layer.

One of the exemplary embodiments, the other print layer comprises a plurality of print blocks, the processor 20 is configured to calculate a plurality of candidate distances between each of the selected blank blocks of the current print layer and each of the print blocks of the other print layer, and select one of the candidate distances as the offset distance (such as selecting the minimum of the candidate distances).

One of the exemplary embodiments, the processor 20 may calculate an average of above-mentioned candidate distances as the offset distance.

Step S35: the processor 20 determines whether the calculated offset distance is not greater than the retrieved threshold distance.

The processor 20 determines that the selected blank blocks may obtain the sufficient adhesion during 3D printing and the probability of failure of printing 3D physical model is lower if the processor 20 determines that the offset distance is not greater than the threshold distance.

Then, the processor 20 performs the step S36. Otherwise, the processor 20 determines that the selected blank blocks may not obtain the sufficient adhesion during 3D printing and the probability of failure of printing 3D physical model is higher. Then, the processor 20 performs the step S37.

Step 36: the processor 20 adds the selected blank block to the editable region of the current print layer for configuring the blank blocks as the editable blocks. Namely, the blocks are selectable by the user during design of the current print layer. Then, the step S38 is performed by the processor 20.

Step S37: the processor 20 adds the blank blocks of the current print layer to a constraints region for configuring the added blank blocks as the constraints blocks. Namely, the blank blocks are configured to be unselectable by the user during design of the current print layer, or the computer apparatus 2 issues a notification if any of the blank blocks is selected by the user. Then, the step S38 is performed.

Step S38: the processor 20 determines whether any of the blank blocks of the current print layer is not added to either the editable region or the constraints region.

The processor 20 performs the step S30 to the step S37 again for adding the blank block to either the editable region or the constraints region if determining that any of the blank blocks is not added to either the editable region or the constraints region. Otherwise, the processor 20 performs the step S23.

Thus, the present disclosed example can effectively make each of the editable blocks of the planned editable region correspond to a lower probability of failure of printing 3D physical model via planning the editable region according to an overlapping relationship and the offset distance.

Figure 6:
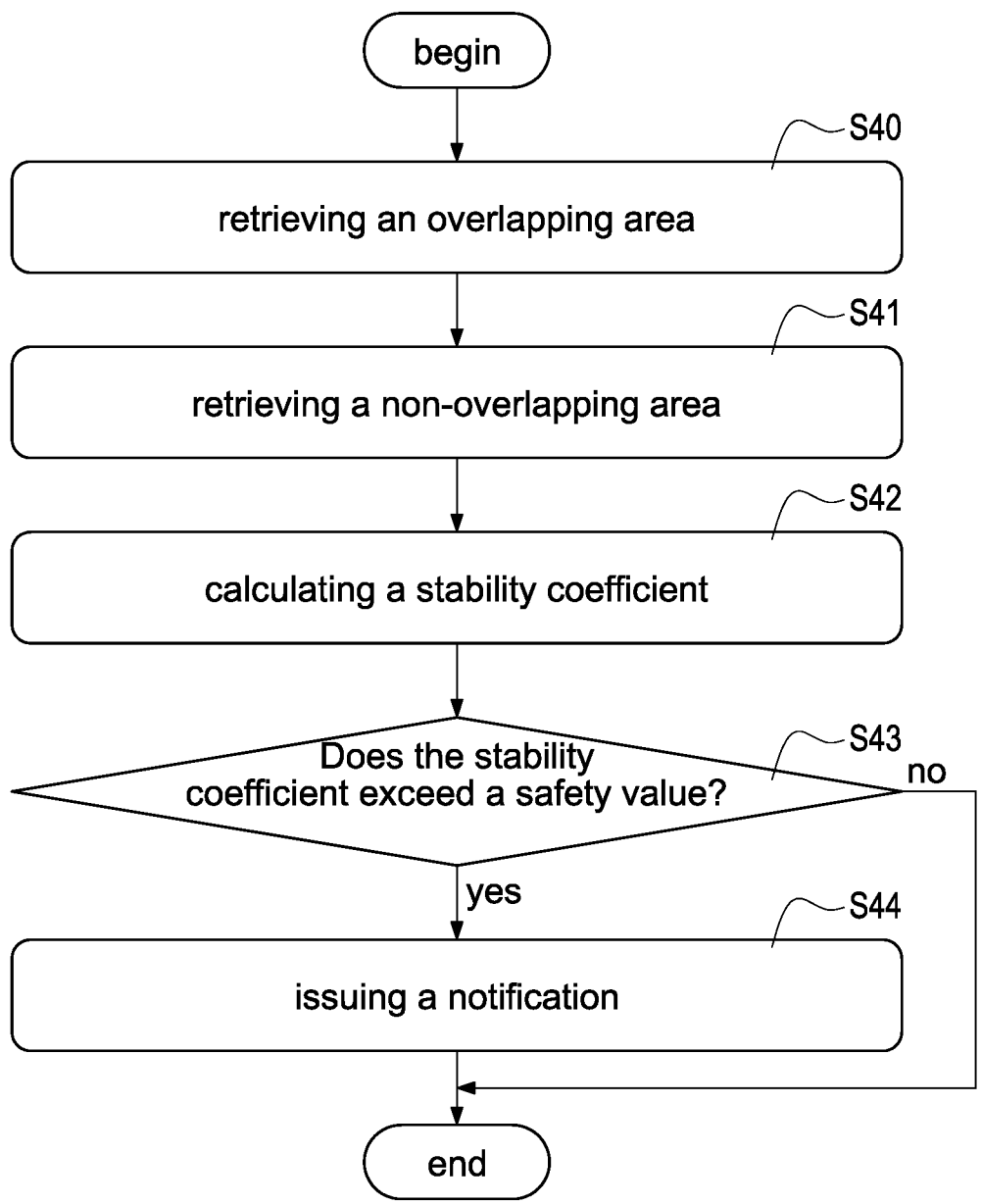
FIG. 6 is a flowchart of a function of an evaluation of a stability coefficient according to a fourth embodiment of the present disclosed example.

Please refer to FIG. 6 simultaneously, which is a flowchart of a function of an evaluation of a stability coefficient according to a fourth embodiment of the present disclosed example. A function of an evaluation of a stability coefficient is disclosed in this embodiment, the function is implemented for calculating a stability coefficient between the current print layer and the other print layer as a reference to the user. More specifically, the aided design method of this embodiment comprises following steps for implementing the function of the evaluation of the stability coefficient.

Step S40: the processor 20 retrieves an overlapping area of the print blocks selected by the user of the current print layer and the print blocks of the other print layer below the current print layer.

One of the exemplary embodiments, the processor 20 is configured to count a number of the print blocks of the current print layer vertically overlapping the print blocks of the other print layer (such as the bottom layer or the previous layer), and configure the counted number as the overlapping area.

Step S41: the processor 20 retrieves a non-overlapping area of the print blocks selected by the user of the current print layer non-overlapping the print blocks of the other print layer.

One of the exemplary embodiments, the processor 20 subtracts the number of the vertically overlapped print blocks from the number of all the print blocks of the current print layer, and configures the calculation result as the non-overlapping area.

Step S42: the processor 20 calculates a stability coefficient according to the overlapping area and the non-overlapping area.

One of the exemplary embodiments, the processor 20 divides the non-overlapping area by the overlapping area, and configures the calculation result as the stability coefficient.

Step S43: processor 20 determines whether the stability coefficient exceeds a default safety value (such as 2).

One of the exemplary embodiments, above-mentioned safety value is determined based on the characteristic of the print materials or the layer number of the current print layer.

The processor 20 performs the step S44 if determining that the stability coefficient exceeds the default safety value. Otherwise, the processor 20 terminates this evaluation of the stability coefficient.

Step S44: the processor 20 issues a notification of reminding a collapse via the display 22 or the output apparatus 23 for reminding the user that a structure of the current print layer may be unstable, such that a failure in 3D printing may be gotten.

Figure 7:
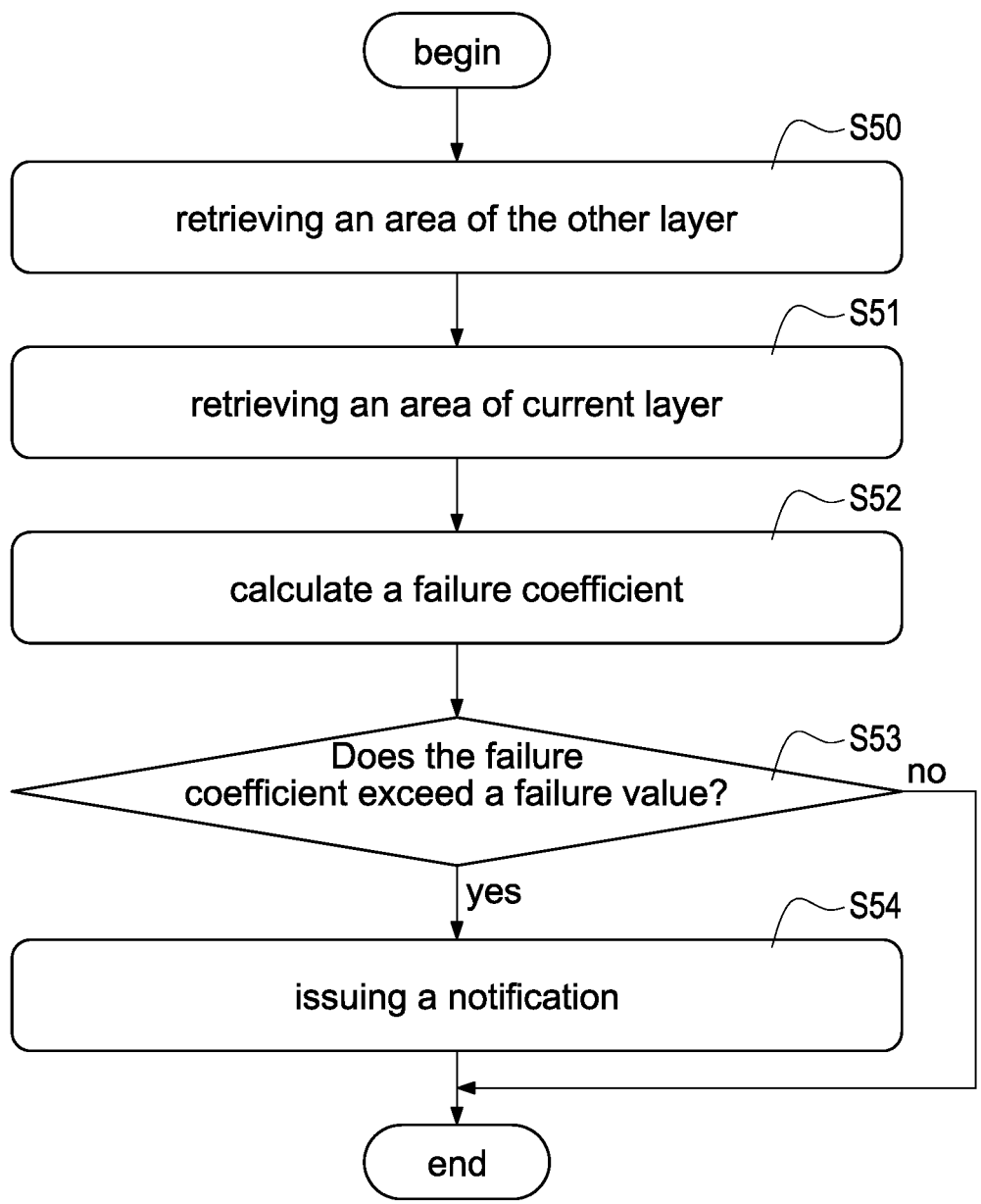
FIG. 7 is a flowchart of a function of an evaluation of a failure coefficient according to a fifth embodiment of the present disclosed example.

Please refer to FIG. 7 simultaneously, which is a flowchart of a function of an evaluation of a failure coefficient according to a fifth embodiment of the present disclosed example. A function of an evaluation of a failure coefficient is disclosed in this embodiment, the function is implemented for calculating a failure coefficient of the current print layer as a reference to the user. More specifically, the aided design method of this embodiment comprises following steps for implementing the function of the evaluation of the failure coefficient.

Step S50: the processor 20 retrieves a first area of the selected print blocks of the other print layer below the current print layer (such as the bottom layer or the previous layer).

One of the exemplary embodiments, the processor 20 configures a number of all of the print blocks of the other print layer as the first area.

Step S51: the processor 20 retrieves a second area of the print block selected by the user of the current print layer.

One of the exemplary embodiments, the processor 20 configures a number of the print blocks of the current print layer as the second area.

Step S52: the processor 20 calculates a failure coefficient according to the first area and the second area.

One of the exemplary embodiments, the processor 20 calculates a difference between the first area and the second area, divides the difference by the first area, and configures the calculation result as the failure coefficient.

Step S53: the processor 20 determines whether the failure coefficient exceeds a default failure value (such as 150%).

One of the exemplary embodiments, above-mentioned failure value is determined based on the characteristic of the print materials or the layer number of the current print layer.

The processor 20 performs the step S54 if determining that the failure coefficient exceeds the failure value. Otherwise, the processor 20 terminates this evaluation of the failure coefficient.

Step S54: the processor 20 issues a notification of reminding a failure in printing via the display 22 or the output apparatus 23 for reminding the user that a structure of the current print layer may be unstable, such that a failure in 3D printing may be gotten.

Figure 8:
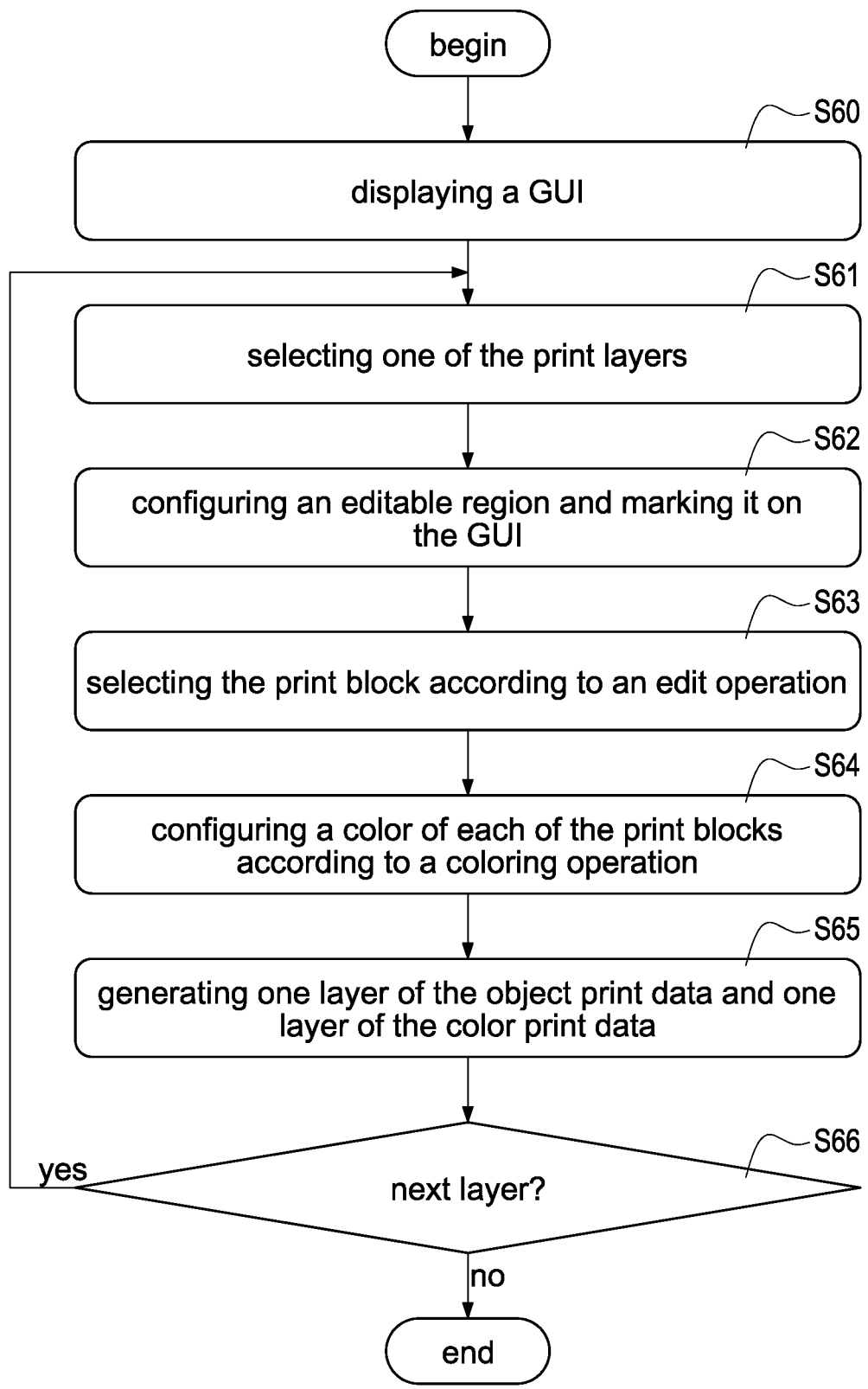
FIG. 8 is a flowchart of an aided design method of print layers according to a sixth embodiment of the present disclosed example.

Please refer to FIG. 8 simultaneously, which is a flowchart of an aided design method of print layers according to a sixth embodiment of the present disclosed example. A function of editing the colors is disclosed in this embodiment, the function is implemented for making the user have an ability of editing a color of each print block of each print layer selected by the user and generating one layer of the corresponding color print data. Moreover, during 3D printing, the 3D print module 31 may color each layer of the printed 3D physical model according to each layer of the color print data for obtaining the color 3D physical model. The method of aiding design method of this embodiment comprises following steps.

Step S60: the processor 20 generates one GUI, and displays the generates GUI on the display 22.

Step S61: the processor 20 selects one of the multiple print layers in order, such as the first print layer. each of above-mentioned print layers comprises a plurality of blank blocks.

Step S62: the processor 20 adds all or parts of the blank blocks of the current print layer to the editable region as the editable blocks according to the print blocks of the other print layer, configures the added blocks as the editable blocks for completion of planning the current print layer, and marks the planned editable regions shown in the GUI. Namely, the processor 20 marks all of the editable blocks.

Step S63: the processor 20 receives the edit operation by the input apparatus 21 from the user, selects one or more editable blocks inside of the planned editable region according to the edit operation, and configures the selected editable blocks as the print blocks.

Step S64: the processor 20 receives a coloring operation by the input apparatus 21 form the user, and determines a color of each of the print blocks configured in the step S63 according to the coloring operation.

Step S65: the processor 20 generates one layer of object print data according to each of the selected print blocks, and generates one layer of color print data according to the color of each of the selected print blocks. For example, the processor 20 generates the first layer of the object print data and the first layer of the color print data.

Step S66: the processor 20 determines whether completion of the design of all the print layers.

The processor 20 terminates the aided design method if determining completion of the design of all the print layers. The step S61 to the step S65 are performed again for selecting the other print layer and designing this print layer if the processor 20 determines incompletion of any print layer. For example, the processor 20 selects the second print layer, plans, configures and marks one or more editable blocks of the editable region of the second print layer, receives the other edit operation and selects all or parts of the print block(s) inside of the editable region of the second print layer according to the other edit operation, configures the color of each of the print blocks, and generates the second layer of the object print data and the color print data according to the selected print block(s).

Thus, the present disclosed example can effectively implement a function of editing the colors. Moreover, the 3D printer 3 can manufacture a color 3D physical model after the 3D printer 3 executes the 3D printing according to the multiple layers of the object print data and the color print data of this embodiment.

Figure 9:
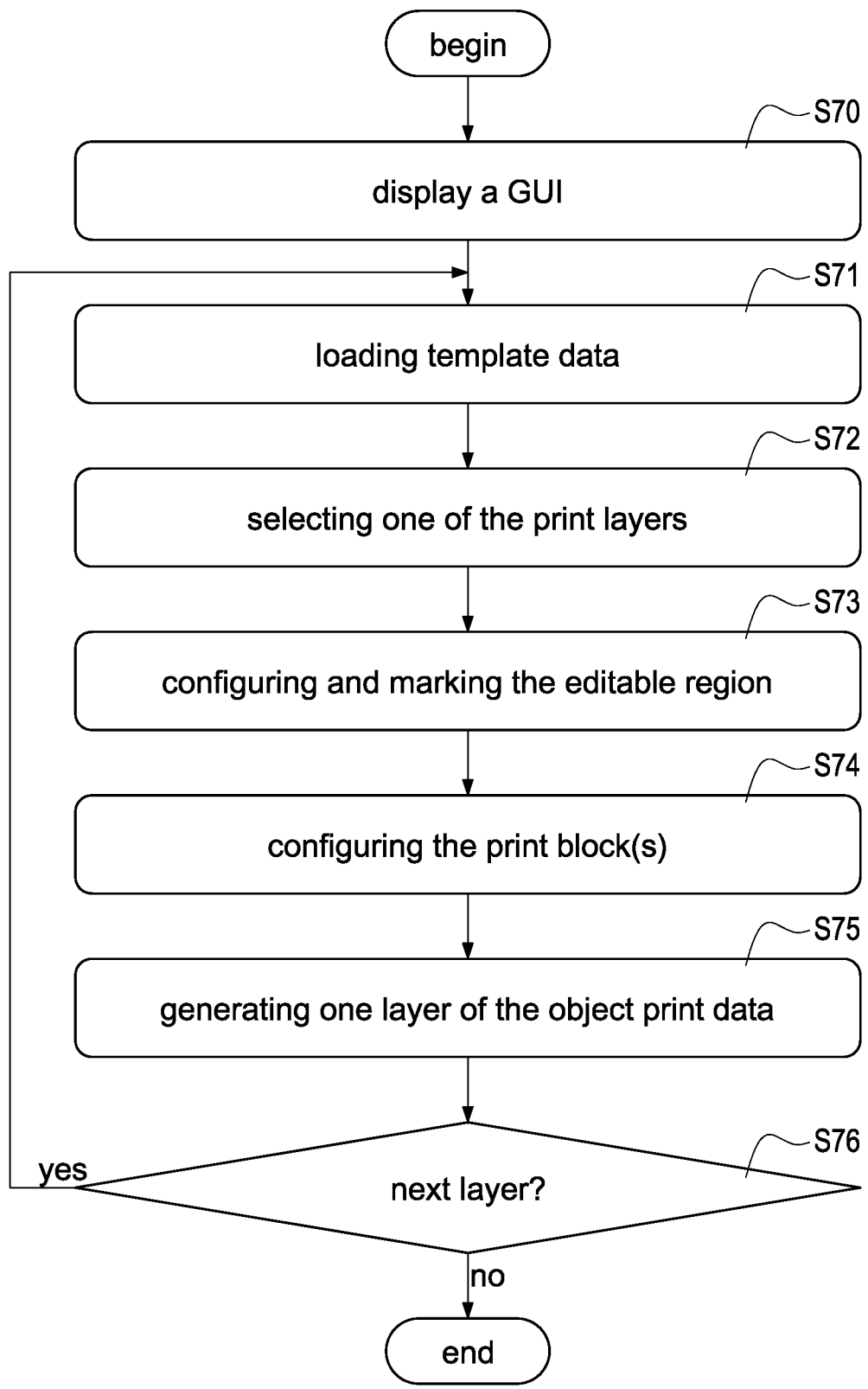
FIG. 9 is a flowchart of an aided design method of print layers according to a seventh embodiment of the present disclosed example.

Please refer to FIG. 9 simultaneously, which is a flowchart of an aided design method of print layers according to a seventh embodiment of the present disclosed example. A function of editing a template is disclosed in this embodiment, the function is implemented for making the user have an ability of directly editing each of the multiple layers of the slice objects (each of the multiple layers of the template data described later) of the existed 3D object for modifying the existed 3D object and obtaining the multiple layers of the object print data corresponding to the modified 3D object. More specifically, the aided design method of this embodiment comprises following steps for implementing the function of editing the template.

Step S70: the processor 20 renders one GUI, and displays the generates GUI on the display 22.

Step S72: the processor 20 loads the multiple layers of the template data from the memory 25. Above-mentioned multiple template data corresponds to one 3D object.

One of the exemplary embodiments, each layer of the template data is used to describe one or more print block(s) of each of the print layers.

One of the exemplary embodiments, the processor loads the 3D object data corresponding to one 3D object, and executes a slicing process on the 3D object data according to the geometric information of the 3D object data for dividing the 3D object into the multiple layers of slice objects and generating the multiple layers of the template data corresponding to the multiple layers of slice objects. Each layer of above-mentioned template data is used to describe an outline or a shape. of each layer of the slice objects.

Step S72: the processor 20 selects one of the multiple print layers in order, such as the first print layer.

Step S73: the processor 20 configures the editable region shown in the GUI of the selected print layer according to the template data, and marks the configured editable region.

One of the exemplary embodiments, the processor 20 may add all of the blank blocks of the current print layer to the editable region as the editable blocks and mark the editable blocks if the selected print layer (the current print layer) is the first layer. The processor 20 configures the editable region of the current print layer according to the print blocks of the other print layer and marks the configured editable region if the current print layer is the second layer or higher.

Step S74: the processor 20 selects one or more editable block(s) as the print block(s) according to the same layer of the template data, displays the selected print block(s) on the display 22, and receives the edit operation by the input apparatus 21 from the user. Moreover, the processor 20 additionally selects the other editable block inside of the editable region as the print block according to the edit operation for increasing the number of the print blocks, or cancels any of the selected print blocks according to the edit operation for reducing the number of the print blocks.

One of the exemplary embodiments, the processor 20 selects one or more editable block(s) inside of the editable region of the current print layer as the print block(s) according to an outline or a shape of the slice object corresponding to the same layer of the template data, and displays the print block(s) on the display 22.

Step S75: the processor 20 generates one layer of the object print data (such as generating the first layer of the object print data) according to the selected print block(s).

Step S76: the processor 20 determines whether completion of the design of all the print layers.

The processor 20 terminates the aided design method if determining completion of the design of all the print layers. The step S72 to the step S75 are performed again for selecting the other print layer and designing this print layer according to the same layer of the template data if the processor 20 determines incompletion of any print layer. For example, the processor 20 selects the second print layer, plans, configures and marks an editable region of the second print layer, selects partial editable blocks inside of the editable region as the print blocks according to the second layer of the template data, receives the other edit operation and increases or cancels the partial print block(s) according to the other edit operation, and generates the second layer of the object print data according to the selected print block(s).

The present disclosed example can reduce both the difficulty and the time of design via the function of editing a template.

Figure 10:
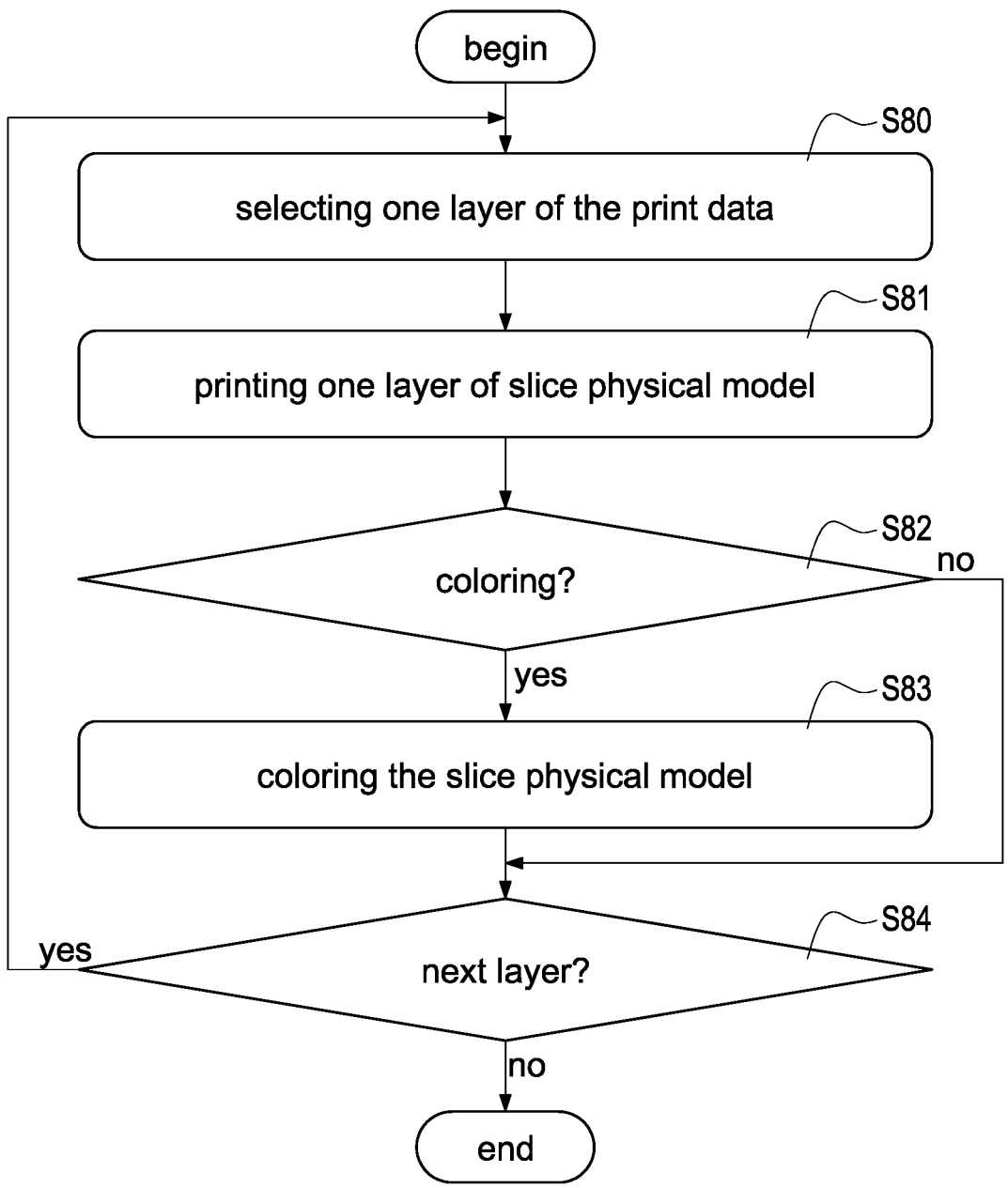
FIG. 10 is a flowchart of 3D printing according to an eighth embodiment of the present disclosed example.

Please refer to FIG. 10 simultaneously, which is a flowchart of 3D printing according to an eighth embodiment of the present disclosed example. A function of 3D printing is disclosed in this embodiment, the function is implemented for execution of 3D printing according to the above-mentioned print data (such as the object print data and the color print data) and manufacturing the corresponding (color) 3D physical model. More specifically, each of the print steps of this embodiment is performed after the control module 30 executes the printing software 330. The aided design method of this embodiment comprises following steps for implementing the function of 3D printing.

Before starting to execute 3D printing, the control module 30 of the 3D printer 3 first loads the multiple layers of the object print data and/or the color print data (if it exists) from the memory module 33, or receives the multiple layers of the object print data and/or the color print data from the computer apparatus 2.

Then, the control module 30 performs the step S80: the control module 30 selects one of the multiple layers of the object print data in order, and selects the same layer of the color print data (if it exists). For example, the control module 30 selects the first layer of the object print data and the color print data.

Step S81: the control module 30 controls the 3D printing module 31 to print one layer of the slice physical model according to the selected layer of the object print data, such as the first layer of the slice physical model.

Step S82: the control module 30 determines whether the slice physical model printed in the step S82 is necessary to be colored according to the selected layer of the color print data.

The control module 30 performs the step S84 if determining that the printed slice physical model is necessary to be colored. Otherwise, the control module 30 performs the step S84.

Step S83: the control module 30 controls the 3D printing module 31 to color the printed slice physical model according to the selected layer of the color print data.

Step S84: the control module 30 determines whether the 3D printing had been completed. More specifically, the control module 30 is configured to determine whether the currently selected layer of the print data (such as the object print data and/or the color print data) is the last layer of the print data.

If the currently selected layer of the print data is the last layer, it expresses that all of the slice physical models have been printed and colored (if it's necessary) and have been stacked into a (color) 3D physical model.

The control module 30 terminates the 3D printing if determining completion of printing. Otherwise, the control module 30 performs the step S80 to the step S84 again for selecting the other layer of the print data. For example, the control module 30 selects the second layer of the print data, controls the 3D printing module 31 to print the second layer of the slice physical model according to the second layer of the object print data, controls the 3D printing modules 31 to color the printed slice physical model according to the second layer of the color print data if the coloring is necessary.

Thus, the present disclosed example can effectively manufacture a 3D slice physical model.

Figure 11A:
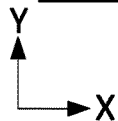
FIG. 11A is a first schematic view of the aided design according to one of embodiments of the present disclosed example.
Figure 11B:
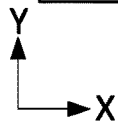
FIG. 11B is a second schematic view of the aided design according to one of embodiments of the present disclosed example.
Figure 11C:
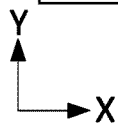
FIG. 11C is a third schematic view of the aided design according to one of embodiments of the present disclosed example.

Please refer to FIG. 11A FIG. 11C simultaneously, FIG. 11A is a first schematic view of the aided design according to one of embodiments of the present disclosed example, FIG. 11B is a second schematic view of the aided design according to one of embodiments of the present disclosed example, and FIG. 11C is a third schematic view of the aided design according to one of embodiments of the present disclosed example. FIG. 11A to FIG. 11C are used to exemplary explain the aided design method in the present disclosed example.

First, as shown in FIG. 11A, the computer apparatus 2 selects the first print layer (bottom layer), and adds all the blank blocks B00-B77 of the first print layer to the editable region as the editable blocks B00-B77. Then, the computer apparatus 2 receives a first-time edit operation, and selects the editable blocks B32-B33, B42-B43 inside of the editable region as the print blocks B32-B33, B42-B43 according to the first-time edit operation. Then, the computer apparatus 2 generates the first layer of the object print data according to a range of the print blocks B32-B33, B42-B43.

Then, as shown in FIG. 11B, the computer apparatus 2 selects the second print layer, and determines the editable region according to the print blocks B32-B33, B42-B43 of the previous layer (the first layer) and a first threshold distance (such as 2). In this example, the computer apparatus 2 is configured to outspread the first threshold distance from the print blocks B32-B33, B42-B43 of the previous layer as the editable region of the current print layer. Namely, the blocks B10-B15, B20-B25, B30-B35, B40-B45, B50-B55, B60-B65 are added to the editable region, the blocks B00-B07, B16-B17, B26-B27, B36-B37, B46-B47, B56-B57, B66-B67, B70-B77 are added to the constraints region.

Figure 11D:
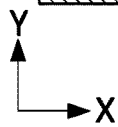
FIG. 11D is a fourth schematic view of the aided design according to one of embodiments of the present disclosed example.

Then, as shown in FIG. 11C, the computer apparatus 2 receives the second-time edit operation, and selects the editable blocks B12-B15, B22-B25, B32-B35, B42-B45, B52-B55, B62-B65 inside of the editable region as the print blocks B12-B15, B22-B25, B32-B35, B42-B45, B52-B55, B62-B65 according to the second-time edit operation. Then, the computer apparatus 2 generates the second layer of the object print data according to a range of the print blocks B12-B15, B22-B25, B32-B35, B42-B45, B52-B55, B62-B65, and so on. The present disclosed example can aid the user to design all layers of the object print data via repeating above-mentioned steps Please refer to FIG. 11A to FIG. 11A, FIG. 11D is a fourth schematic view of the aided design according to one of embodiments of the present disclosed example. One of the exemplary embodiments, the computer apparatus 2 may plan an editable region according to two or more print layers and two or more threshold distances.

For example, the computer apparatus plans the editable region according to the bottom print layer, the previous print layer and two threshold distances (the first threshold distance is 2, and the second threshold distance is 3).

As shown in FIG. 11D, the computer apparatus 2 selects the third print layer, and outspreads the first threshold distance from the print blocks B12-B15, B22-B25, B32-B35, B42-B45, B52-B55, B62-B65 of the previous print layer (the second print layer) to determine the first editable region (the first editable region comprises the blocks B00-B77).

Then, the computer apparatus 2 outspreads the second threshold distance from the print blocks B32-B33, B42-B43 of the bottom print layer (the first print layer) to determine the second editable region (the second editable region comprises the blocks B00-B06, B10-B16, B20-B26, B30-B36, B40-B46, B50-B56, B60-B66, B70-B76).

Finally, the computer apparatus 2 executer an intersection operation on the first editable region and the second editable region for obtaining the final editable region (the blocks B00-B06, B10-B16, B20-B26, B30-B36, B40-B46, B50-B56, B60-B66, B70-B76 belong the editable region, and the blocks B07, B17, B27, B37, B47, B57, B67, B77 belong the constraints region).

The present disclosed example can make sure that each of the print blocks of each print layer will obtain the sufficient support force during 3D printing and reduce the probability of failure in printing via planning the editable region of each of the print layers according to the previous print layer. Moreover, the present disclosed example can make sure that all the print layers won't over-deviate the bottom layer and prevent the 3D physical model from collapsing caused by unsteady via planning the editable region of each print layer according to the bottom print layer.

The above-mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. An aided design method of print layers for 3D printing, comprising following steps:
   a) controlling a computer apparatus to render a GUI and displaying the GUI;
   b) selecting one of multiple print layers from bottom to top in orders, wherein each of the print layers comprises a plurality of blank blocks;
   c) configuring an editable region of a current print layer and marking the editable region, wherein configuring the editable region comprising: calculating an offset distance between each of the blank blocks of the current print layer and the other print layer and configuring at least one blank block which a corresponding offset distance is not larger than a threshold distance as at least one editable block of the editable region;
   d) selecting the at least one editable block of the editable region as at least one print block according to an edit operation, wherein a failure coefficient calculated according to a first area of the at least one print block of the other print layer and a second area of the at least one print block of the current print layer does not exceed a failure value;
   e) generating one layer of object print data according to the at least one print block; and
   f) performing the step b) to the step e) repeatedly until all of the multiple layers of the object print data have been generated.

2. The aided design method of print layers for 3D printing according to claim 1, further comprising following steps:
   g1) before the step f), configuring a color of each of the print blocks according to a coloring operation; and
   g2) generating one layer of color print data according to the color of each of the print blocks.

3. The aided design method of print layers for 3D printing according to claim 2, further comprising following steps:
   h1) controlling a 3D printer to print one layer of slice physical model according to one layer of the object print data; and
   h2) controlling the 3D printer to color the printed slice physical model according to the same layer of the color print data if determining that the printed slice physical model is necessary to be colored.

4. The aided design method of print layers for 3D printing according to claim 1, wherein the other print layer is below the current print layer; configuring the editable region further comprises:
   configuring all of the blank blocks of the current print layer as the editable blocks of the editable region if determining that the current print layer is a bottom layer.

5. The aided design method of print layers for 3D printing according to claim 4, configuring the editable region further comprises:
   configuring the blank block of the current print layer as the editable block of the editable region if determining that the current print layer is not the bottom layer and the position of the blank block overlaps a position of any of the print blocks of the other print layer; and
   calculating the offset distance between each of the blank block of the current print layer and the at least one print block of the other print layer if determining that the current print layer is not the bottom layer and the position of the blank block doesn't overlap the position of all the print blocks of the other print layer, selecting the at least one blank block which the corresponding offset distance is not larger than the threshold distance, and configuring the at least one blank block being selected as the editable block.

6. The aided design method of print layers for 3D printing according to claim 1, wherein the other print layer is a previous layer to the current print layer.

7. The aided design method of print layers for 3D printing according to claim 1, wherein the other print layer is a bottom layer.

8. The aided design method of print layers for 3D printing according to claim 1, further comprising following steps:
- i1) retrieving an overlapping area of the at least one print block of the current print layer and the at least one print block of the other print layer;
- i2) retrieving a non-overlapping area of the at least one print block of the current print layer and the at least one print block of the other print layer;
- i3) calculating a stability coefficient according to the overlapping area and the non-overlapping area; and
- i4) control the computer apparatus to issue a notification of reminding a collapse if the stability coefficient exceeds a safety value.

9. The aided design method of print layers for 3D printing according to claim 1, further comprising:

controlling the computer apparatus to issue a notification of reminding a failure in printing if the failure coefficient exceeds the failure value.

10. The aided design method of print layers for 3D printing according to claim 1, wherein the failure coefficient is obtained by calculating a difference between the first area and the second area and dividing the difference by the first area.

11. The aided design method of print layers for 3D printing according to claim 1, wherein the failure value corresponds to a characteristic of print materials of a 3D printer or a layer number of the current print layer.

12. The aided design method of print layers for 3D printing according to claim 1, further comprising a step k) performed before the step b): loading multiple layers of template data; the step d) is configured to select at least one of the multiple editable blocks as the at least one print blocks according to the same layer of the template data, and additionally select the other editable block as the print blocks or cancel any of the print blocks according to the edit operation.

* * * * *